June 16, 1959 — A. M. D. JUNIOR — 2,891,126
ELECTRIC CURRENT AUTOMATIC SWITCHES
Filed Sept. 27, 1955

INVENTOR
ARMANDO M. D. JUNIOR

BY Mock and Blum
ATTORNEY

United States Patent Office 2,891,126
Patented June 16, 1959

2,891,126
ELECTRIC CURRENT AUTOMATIC SWITCHES
Armando Maciel Dantas Junior, Rio de Janeiro, Brazil
Application September 27, 1955, Serial No. 536,877
4 Claims. (Cl. 200—138)

In electric apparatuses such as electric coffee percolators, wherein the switching on of the electric current and the switching off thereof are manually accomplished, it is quite usual for the resistor to burn off resulting in an almost total damage to the apparatus, owing to a failure on the part of the operator to switch off the electric current at the proper time. In order to prevent such a serious handicap with the electric apparatuses, as in electric coffee percolators, I have invented a new automatic device, which is an essentially simple one, though it is far reaching in its results.

The present patent specification refers to a new automatic switch for electric current, intended for electric coffee percolators or similar electric apparatuses, whereby the electric current can be automatically cut off, i.e., when the normal operating time scheduled for the operation of the percolator is at an end.

I tried to conceive a new automatic device which would comprise a simple mechanism, being easy to put in practice, rapid and accurate to regulate, capable of proving efficient, and comprising as few parts as possible, for it is obvious that the more parts an apparatus is made of the more are the failures it presents in its operation. I further tried to build the new automatic device out of a single block, i.e., putting together its components so as to form a rigid easily removable assembly, which would be easy in adaptation to any electric apparatus, such as in electric coffee percolators.

Since manual regulation, by means of screws and other well-known devices, is rather undesirable, in view of the fact that it depends on the hand of the operator, whereby it is liable to many variations and unpredictable inconveniences, I also tried to prevent such a serious handicap, for which I tried to effect this important regulation through electric means, i.e., dispensing with any possible direct control on the part of the operator. To this effect I conceived an automatic device, indeed, a mechanical regulation, consisting of a special shape double tooth properly designed for automatically switching off the apparatus at the proper time. Since this device in the new automatic switch works under the principle of thermical distortion of a bi-metallic element constituted, as its name implies, by two metal elements with different coefficients distention of, I tried swaging such a double tooth on this bi-metallic material, whereby an excellent result was achieved.

The new automatic switch, constituting the object of the present invention, is used at the bottom of the electric coffee percolator, and it is presented as follows in the accompanying drawings.

The automaic device seats on a porcelain piece $a$, of special shape, planned with the utmost technical accuracy, which is electrically insulant and free of distortion by heat, since these conditions are essential for a sound operation of said automatic device and insure the utmost accuracy both in dimension figures and any other measuring elements among the component elements.

Figure 2:
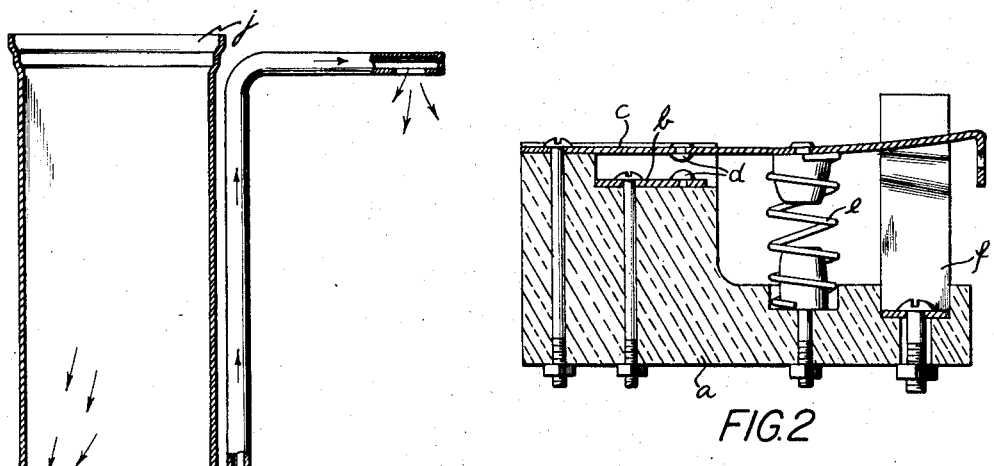
Fig. 2 is a detailed view of the new automatic switch assembly such as it is seen separately.
Figure 1:
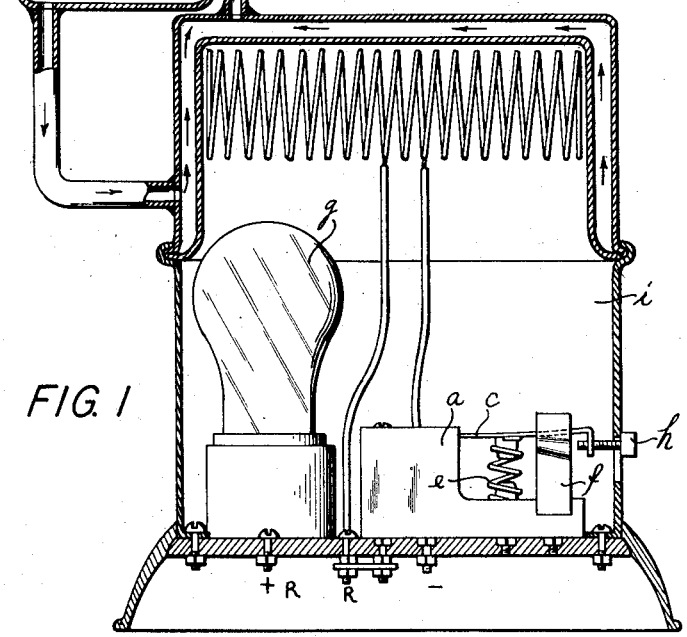
Fig. 1 is a cross section of an electric coffee percolator, showing the position the new automatic switch occupies on the bottom of said coffee percolator.

The new automatic switch is integrated by following parts: two rust free steel blades, viz. a fixed $b$ and a movable $c$ one, whereto the electric contact rivets (platinated pieces) are attached to $d$; a hardened steel spring $e$ intended as an aid to the movable steel blade $c$ while in its returning movement to normal position— by the time of the automatic switching off; that blade is properly guided by means of two lathe turned brass pins, the first one being located on the blade $c$ and the other one anchored to the porcelain piece $a$ so as to insure a perfect central setting for the spring. The bi-metallic unit $f$ comprises a U-shaped member having two upstanding rectangular legs, one of the legs being illustrated in Figure 1 and the other being illustrated in Figure 2. The upstanding legs each consist of two metal strips of different temperature coefficients of expansion, the metals being chosen so that upon heating, the legs deflect outwardly. Each leg is provided with an inclined tooth in the form of a semi-cylindrical member formed on the inner surface of each leg by embossing with the displaced metal facing inwardly and the concave side outwardly; the two teeth being parallel and coplanar. All of these pieces constituting the new automatic are solidly anchored to the porcelain unit $a$ by means of brass screws and nuts.

Besides this automatic device which is the object of the present invention, the electric mechanism comprises a heating resistor and a pilot-lamp $g$, parallel inserted in the circuit, in order to show the operator that the current has been cut off.

Figure 3:
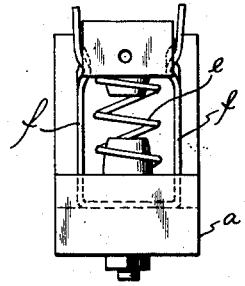
Fig. 3 is a front elevational view of the apparatus illustrated in Figure 2.
Figure 4:
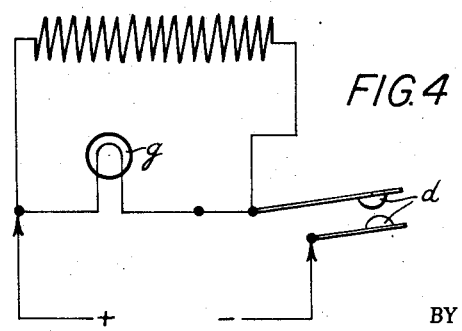
Fig. 4 is a view showing the diagram of the connections.

The operation of the automatic device is a very simple one and will be easily understood by reference to the diagram in Fig. 3.

With a slight pressure on switching on knob $h$ placed on the outer side of the electric coffee percolator, which knob is rigidly attached to movable blade $c$, it causes the latter to be engaged by the lower part of the bi-metal double tooth $f$ so starting the electric contact by consequent coupling of rivets $d$; by this time the resistor warms up and the pilot-lamp lights on, which gives to the operator a visual notion of the coffee percolator operation. As the temperature of the heating chamber $i$ in the electric coffee percolator gets higher, the bi-metal element is slowly distorted owing to its constitution. After all of the water in the container $j$ is steamed out, the temperature in the heating chamber $i$ will rapidly reach higher above 100° C., since there will be no more water for absorbing the electric resistor calories so as to keep temperature lower than 100° C., whereupon the bi-metal element will suffer rapid distortion due to the excessive temperature in the heating chamber $i$, and the U-shaped members of the bi-metal element will bend outward, so the movable blade $c$ of the double tooth will be free, and aided by the spring $e$ and owing to the resilience of the rust free steel it is made of, it will return to its former horizontal position. By this time, both of the electric contact rivets will move apart of each other cutting off the electric connection, which makes possible a rigorously automatic performance with this process.

What I claim is:

1. A bi-metallic switch unit for use in the heating chamber of an electric percolator and subject to the surrounding temperature of said heating chamber, said unit comprising an L-shaped porcelain base secured in the bottom of said heating chamber, a pair of spaced, parallel and elongated legs having inner parallel surfaces, each of said legs having a first end rigidly secured to the leg of the L-shaped base and having a second end free to move, each said legs including two substantially identical metallic elements of different temperature coefficients of expansion, said metallic elements being arranged so that upon being heated by the surrounding temperature in the heated chamber of the percolator, the spacing between said legs is increased, a pair of coplanar teeth embossed on the inner surface of a different one of said legs adjacent the free ends thereof, a cantilevered element having one end fixed to the upstanding portion of the L-shaped base and a free end disposed between said legs, said free end having a normal position between said free end of said legs and said teeth, means for deflecting said cantilevered element so as to position it between said teeth and said secured end of said legs, the spacing between the legs being such as to engage and hold said cantilevered element when said legs are unheated.

2. The combination in accordance with claim 1 wherein said teeth are inclined with respect to said free ends of said legs.

3. The combination in accordance with claim 1 further comprising a first switch contact secured to said cantilevered element, a second contact member fixed to the upstanding portion of the L-shaped base in line with the first contact and means secured to the free end of said cantilevered element and projecting through the heating chamber to position the first contact member so as to be engaged by the second contact member when the cantilevered element is engaged by the teeth.

4. The combination in accordance with claim 1 further comprising spring means for returning the cantilevered element to its normal position when said legs are heated sufficiently to disengage said teeth and cantilevered element, said spring means including a stud on the lower face of the cantilevered free end, a stud on the leg of the L-shaped base spaced from the first stud and a coil spring having one of its free ends engaged over the first stud and the other free end engaged with the second stud.

References Cited in the file of this patent

UNITED STATES PATENTS

| | | |
|---|---|---|
| 1,022,016 | Andrews | Apr. 2, 1912 |
| 1,990,546 | Hubbard | Feb. 12, 1935 |
| 2,282,967 | Keefe | May 12, 1942 |
| 2,666,114 | Jackson | Jan. 12, 1954 |
| 2,738,396 | Strafford et al. | Mar. 13, 1956 |